US012683395B2

(12) United States Patent
Powers et al.

(10) Patent No.: US 12,683,395 B2
(45) Date of Patent: Jul. 14, 2026

(54) TECHNIQUES FOR PREDICTIVE CONTROL OF ENERGY USE IN A STRUCTURE

(71) Applicant: ELEXITY, INC., Bend, OR (US)

(72) Inventors: John Powers, Lafayette, CA (US); Ari Halberstadt, Davis, CA (US); Layne Clemen, Corvallis, OR (US); Rodin Porrata, Livermore, CA (US); Keith Mosher, Kensington, CA (US); Cameron Barclift, Portland, OR (US)

(73) Assignee: ELEXITY, INC., Bend, OR (US)

( * ) Notice: Subject to any disclaimer, the term of this patent is extended or adjusted under 35 U.S.C. 154(b) by 560 days.

(21) Appl. No.: 18/070,373

(22) Filed: Nov. 28, 2022

(65) Prior Publication Data

US 2023/0170697 A1 Jun. 1, 2023

Related U.S. Application Data

(60) Provisional application No. 63/284,557, filed on Nov. 30, 2021.

(51) Int. Cl.
| | |
|---|---|
| *G05F 1/12* | (2006.01) |
| *H02J 3/00* | (2026.01) |
| *H02J 3/04* | (2026.01) |
| *H02J 3/38* | (2026.01) |
| *H02J 101/22* | (2026.01) |

(52) U.S. Cl.
CPC ............... *H02J 3/004* (2020.01); *G05F 1/12* (2013.01); *H02J 3/381* (2013.01); *H02J 2101/22* (2026.01)

(58) Field of Classification Search
CPC ........ H02J 3/004; H02J 3/381; H02J 2300/22; G05F 1/12
See application file for complete search history.

(56) References Cited

U.S. PATENT DOCUMENTS

| | | | | |
|---|---|---|---|---|
| 6,542,791 | B1 * | 4/2003 | Perez ........................ | G05F 1/67 |
| | | | | 307/66 |
| 12,261,434 | B2 * | 3/2025 | Wenzel .................... | H02J 3/003 |
| 12,264,828 | B2 * | 4/2025 | Nesler ..................... | G16H 40/20 |
| 2003/0182023 | A1 * | 9/2003 | Perez ...................... | H02J 3/381 |
| | | | | 700/291 |
| 2012/0029897 | A1 * | 2/2012 | Cherian ............. | G05B 19/0421 |
| | | | | 703/18 |
| 2012/0143385 | A1 * | 6/2012 | Goldsmith .............. | H02J 3/466 |
| | | | | 700/297 |
| 2013/0046895 | A1 * | 2/2013 | Metcalfe ........... | H02J 13/00006 |
| | | | | 709/226 |

(Continued)

OTHER PUBLICATIONS

International Search Report for Application No. PCT/US2022/080711 dated Apr. 11, 2023.

*Primary Examiner* — Ziaul Karim
(74) *Attorney, Agent, or Firm* — Lewis Kohn & Walker LLP; David M. Kohn; Kari Moyer-Henry

(57) ABSTRACT

A computer-implemented method for controlling a plurality of systems included within one or more structures includes: selecting a first controller from a set of multiple of controllers; with the first controller, determining a control action for a device included in a first system within the one or more structures based on current state information associated with the one or more structures and forecast information; and transmitting a control signal based on the control action to the device.

19 Claims, 8 Drawing Sheets

(56) References Cited

U.S. PATENT DOCUMENTS

| | | | |
|---|---|---|---|
| 2014/0062424 A1* | 3/2014 | Larsen | H02P 9/007 |
| | | | 322/24 |
| 2016/0377306 A1* | 12/2016 | Drees | F24F 11/46 |
| | | | 700/295 |
| 2017/0102162 A1* | 4/2017 | Drees | F24F 11/46 |
| 2017/0324243 A1* | 11/2017 | Ghosh | G05B 13/026 |
| 2018/0252428 A1* | 9/2018 | Malcolm | F24F 11/46 |
| 2021/0281077 A1* | 9/2021 | Cai | G06Q 50/06 |
| 2021/0356916 A1* | 11/2021 | Wenzel | G06F 1/3203 |

* cited by examiner

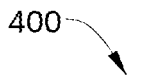
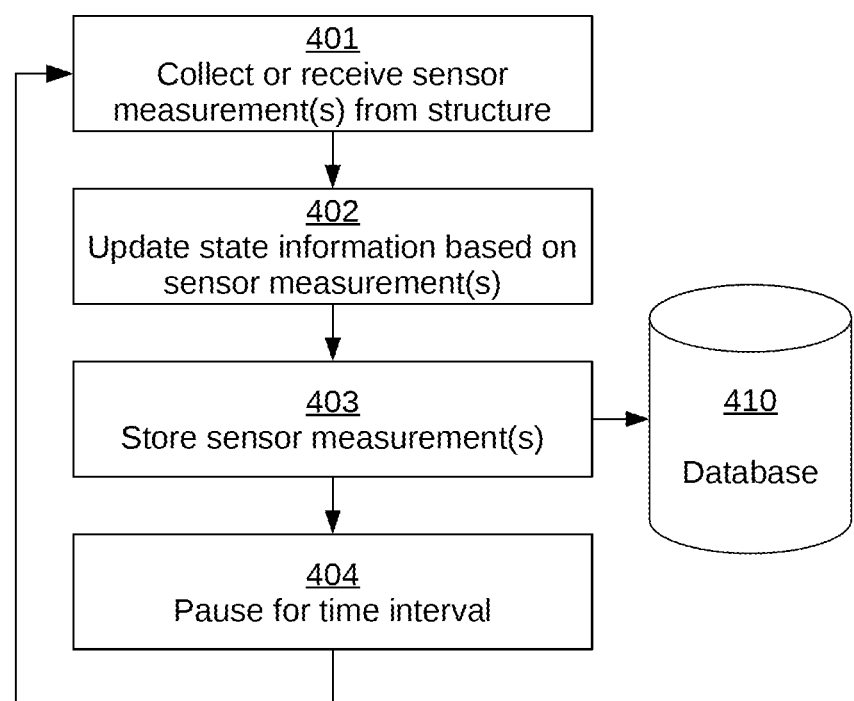
FIG. 4

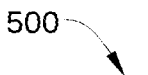

500

```
┌──────────────────────────────┐
│             501              │
│ Initialize predictive controller │◄──────────────┐
└──────────────────────────────┘                   │
              │                                     │
              ▼                                     │
┌──────────────────────────────┐                   │
│             502              │                   │
│ Load data for predictive controller │            │
└──────────────────────────────┘                   │
              │                                     │
              ▼                                     │
┌──────────────────────────────┐                   │
│             503              │                   │
│ Initialize predictive models with │               │
│        loaded data           │                   │
└──────────────────────────────┘                   │
              │                                     │
              ▼                                     │
┌──────────────────────────────┐  ┌──────────────────────────────┐
│             504              │  │             511              │
│ Determine control action(s)  │  │      Attempt recovery        │
│   with selected controller   │  └──────────────────────────────┘
└──────────────────────────────┘            ▲ Yes
              │                              │
              ▼                              │
        ╱────505────╲              ╱────510────╲
       ╱ Selected controller ╲    ╱  Is recovery controller ╲
      ╱ successfully generates  ╲──╱       available?        ╲
       ╲  control action(s)?   ╱ No ╲                      ╱
        ╲─────────────╱              ╲─────────────╱
              │ Yes                         │ No
              ▼                             ▼
┌──────────────────────────────┐  ┌──────────────────────────────┐
│             506              │  │             520              │
│ Send control action(s) to suitable │→ │            End             │
│     receiver for translation │  └──────────────────────────────┘
└──────────────────────────────┘
```

FIG. 5

700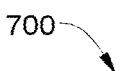

Predictive Controller 200                                    Control Interface(s) 220

| 702 Receive request for control instructions | ← | 701 Transmit request for control instructions |

↓

703
Select primary controller from set of available controllers

↓

704
Generate control action(s) using the selected controller

711
Select another controller from set of available controllers

705
Selected controller successfully generates control actions?          No

↓ Yes

706
Translate control action(s) into control instructions

↓

707
Return control instructions to control interface          →          708
Receive control instructions

↓

709
Translate control instructions into control signals

↓

710
Transmit control signals to system or device

FIG. 7

TECHNIQUES FOR PREDICTIVE CONTROL OF ENERGY USE IN A STRUCTURE

CROSS-REFERENCE TO RELATED APPLICATIONS

This application claims priority benefit of the United States Provisional Patent Application titled, "TECHNIQUES FOR CONTROLLING ONE OR MORE SYSTEMS WITHIN A STRUCTURE" filed on Nov. 30, 2021 and having Ser. No. 63/284,557. The subject matter of this related application is hereby incorporated herein by reference.

BACKGROUND

Field of the Various Embodiments

The various embodiments relate generally to computer science, artificial intelligence, and control systems, and, more specifically, to techniques for predictive control of energy use in a structure.

Description of the Related Art

Modern commercial buildings and other such structures oftentimes employ a variety of controllable systems. Such systems can include heating, ventilation, and air-conditioning (HVAC) systems, rooftop solar power generation installations, electric vehicle charging stations, power storage systems, and automatic and manually operated lighting systems, to name a few. Many of these systems consume large quantities of electrical power, while others can reduce the power consumed by a building during certain time periods of a day.

Because power consumption can be a major operating expense for a building, various techniques have been developed to optimize energy consumption in commercial buildings and other industrial and residential structures. However, the operation of such buildings and structures can be quite complex. As a result, conventional techniques oftentimes fail to reliably improve the energy performance of buildings and structures. For example, many conventional approaches focus on the energy consumption or generation of only individual systems within a structure. One drawback of these approaches is that interactions between the individual systems are not accounted for and, therefore, cannot be optimized. For example, with such approaches, the use of an energy-consuming system associated with an office building, such as an electric vehicle charging station, would not be timed to coincide with the peak energy generation window of a solar array that also is associated with the office building. As a result, the peak vehicle charging window for the vehicle charging station could occur early in the day and at a time when the energy generated by the solar array is low, and the power use by other systems associated with the office building is high. Such an outcome would represent a suboptimal use of the solar array and the energy generated by the solar array.

Some other conventional approaches involve the development of building-specific energy-use models that are then used to control various independent systems within a building. One drawback of these approaches is that developing such energy-use models relies on the collection of accurate site-specific energy-use data and building structure measurements, which can be a difficult and time-consuming process. Another drawback of these approaches is that the implementation of an energy-use model that can communicate reliably with the disparate data streams from the individual devices included in the various independent systems within a building requires the development of customized software for a given building. Yet another drawback of these other approaches is that the thermal and energy-consumption behavior of a particular building can be quite dynamic over time and can change based on building occupancy and utilization, installation or removal of certain systems or system components, changes of seasons, modifications to the floorplan, and other similar variables. As a result, a model based on the thermal and energy-use behavior of a particular building can become reasonably obsolete or inaccurate in a short period of time, resulting in sub-optimal energy use by the building.

As the foregoing illustrates, what is needed in the art are more effective techniques for controlling energy use in commercial buildings and other structures.

SUMMARY

A computer-implemented method for controlling a plurality of systems included within one or more structures includes: selecting a first controller from a set of multiple of controllers; with the first controller, determining a control action for a device included in a first system within the one or more structures based on current state information associated with the one or more structures and forecast information; and transmitting a control signal based on the control action to the device.

At least one technical advantage of the disclosed techniques relative to the prior art is that the disclosed techniques enable the energy use within a given building or structure to be controlled across multiple different systems and controllers within the building or structure. Notably, the coordinated control of energy use among the various systems within a building or structure, such as HVAC systems, electrical vehicle charging systems, renewable energy generation systems, on-site energy storage systems, and the like, enables an optimal level of energy use by the building or structure, as a whole. Another technical advantage of the disclosed techniques is that a site-specific adaptive control process for energy use can be automatically implemented for a given building or structure without the need for complex commissioning procedures, such as manual on-site measurements and energy-use data collection, or the manual development of a site-specific energy-use model that has to be programmed on a building-by-building basis or structure-by-structure basis. In contrast to the static energy-use models implemented in conventional approaches, the adaptive control process enabled by the disclosed techniques can automatically modify the control of one or more systems within a building or structure to compensate for, and respond to, changes in the energy-use behavior of the overall building or structure. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 4 sets forth a flowchart of method steps for performing a data collection process for a predictive controller, according to various embodiments.

FIG. 5 sets forth a flowchart of method steps for performing a predictive control process, according to various embodiments.

FIG. 7 sets forth a flowchart of method steps for performing an instruction translation process, according to various embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
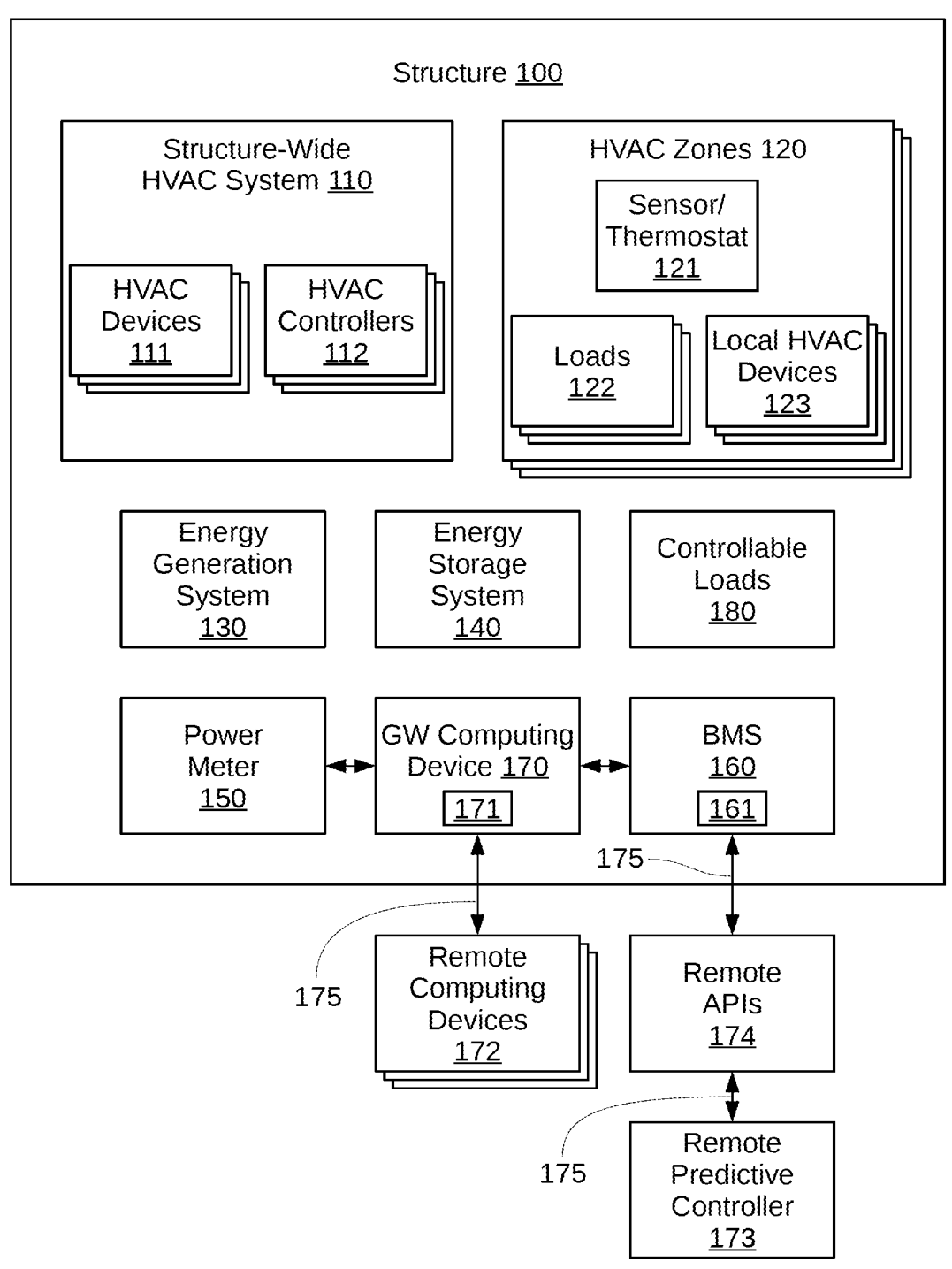
FIG. 1 illustrates a structure configured to implement one or more aspects of the various embodiments.

FIG. 1 illustrates a structure 100 configured to implement one or more aspects of the various embodiments. Structure 100 can be any commercial building, residential building, warehouse, industrial facility, or other structure that includes multiple controllable energy-generating and/or energy consuming systems. As such, structure 100 includes one or more of a structure-wide HVAC system 110, one or more HVAC zones 120, one or more energy-generating systems 130, and/or one or more energy storage systems 140. In the embodiment illustrated in FIG. 1, structure 100 further includes a power meter 150, a building management system (BMS) 161, and/or a gateway (GW) computing device 170.

While the various embodiments are described herein with respect to a single structure 100, the various embodiment can also be implemented in multiple structures, such as a campus or other group of buildings and/or structures. In such embodiments, the multiple structures 100 may be associated with a single utility account and/or power meter 150. In such embodiments, energy use within a group of buildings or structures can be controlled across multiple different systems and controllers within the group of buildings or structures.

Structure-wide HVAC system 110 includes one or more HVAC devices 111 for providing heating, cooling, and/or humidity control to some or all of structure 100, such as chillers, boilers, supply fans, exhaust fans, cooling coils, heating coils, cooling towers, humidifiers, water pumps, fan-powered terminal air units (such as variable air volume boxes and/or constant air volume boxes), roof-top units, and/or the like. In some embodiments, certain components of structure-wide HVAC system 110 serve common areas of structure 100. Alternatively or additionally, in some embodiments, certain components of structure-wide HVAC system 110 serve one or more HVAC zones 120, which are conditioned spaces within structure 100. In some embodiments, some or all of HVAC devices 111 include a corresponding controller 112. Alternatively or additionally, in some embodiments, control of some or all of HVAC devices 111 is performed by BMS 161, which resides in a computing device 160.

In the embodiment illustrated in FIG. 1, structure 100 includes one or more HVAC zones 120, and the heating, cooling, and/or humidity control of each zone can be controlled separately from the other HVAC zones 120. Thus, in some embodiments, some or all of HVAC zones 120 include a thermostat 121 for providing temperature and/or other local zone data to a local HVAC device 121 serving the corresponding HVAC zone 120 and/or to BMS 161. Alternatively or additionally, in some embodiments, some or all of thermostats 121 for specific HVAC zones 120 provide temperature and/or other local zone data to one or more controllers 112 for HVAC devices 111 that serve those specific HVAC zones 120. Alternatively or additionally, in some embodiments, some or all of thermostats 121 for specific HVAC zones 120 provide temperature and/or other local zone data to BMS 161.

In some embodiments, structure 100 includes one or more energy-generating systems 130 that can include one or more roof-top solar arrays. In such embodiments, each of the one or more roof-top solar arrays can have a similar solar aspect. Alternatively, in some embodiments, each of the one or more roof-top solar arrays can have a different solar aspect. In such embodiments, at a particular time of day, each solar array generally generates a different quantity of solar power than the other solar arrays. Alternatively or additionally, in some embodiments, energy-generating systems 130 can include one or more other renewable energy-generating systems, such as a geothermal energy system and/or a wind-based energy-generating system. In the case of a wind-based energy-generating system, the quantity of energy generated by the energy-generating system varies based on wind speed and prevailing wind direction.

In some embodiments, structure 100 includes one or more energy storage systems 140. In such embodiments, the one or more energy storage system 140 can include on-site batteries for storing electrical power locally, such as a battery energy storage system (BESS). A BESS enables electrical energy generated by the one or more energy-generating systems 130 associated with structure 100 to be stored and then released at a later time, such as during a high-demand time period for structure 100.

In some embodiments, structure 100 includes one or more controllable loads 180. Controllable loads 180 are energy consuming devices that are controlled via an associated controller or control mechanism that can be communicated with by BMS 161, predictive controller 171, and/or remote predictive controller 173, for example via a wired and/or wireless connection (not shown). For example, in some embodiments, controllable loads 180 include lighting systems or devices, pumps, air compressors, and/or the like. Alternatively or additionally, in some embodiments, controllable loads 180 include components of structure-wide HVAC system 100 (e.g., HVAC devices 111), HVAC zones 120 (e.g., loads 122 and/or local HVAC devices 123), and/or energy storage system 140. Thus, controllable loads 180 include various systems or devices that can be selectively controlled to adjust power consumption by structure 100, for example by being turned on or off and/or by being controlled to operate at higher or lower power consumption levels.

Power meter 150 includes one or multiple devices for monitoring electrical energy use by structure 100. In some embodiments, power meter 150 includes one or more electronic power meter devices that digitally measure the amount of electrical energy consumed by structure 100. Generally, the one or more electronic power meter devices, when taken together, measure all electrical power consumed by structure 100. Consequently, in some embodiments, power meter 150 enables high frequency tracking of electrical energy consumed by structure 100, for example on the order of once per minute or once per second. In some embodiments, power meter 150 is communicatively coupled to BMS 161, predictive controller 171, and/or remote predictive controller 173, for example via a wired and/or wireless connection (not shown). Alternatively, in some embodiments, BMS 161, predictive controller 171, and/or remote predictive controller 173 operate without being communicatively coupled to a power meter 150. In such embodiments, energy consumed by structure 100 can be estimated by BMS 161, predictive controller 171, and/or remote predictive controller 173. Alternatively, in some embodiments, a different device than power meter 150 transmits data associated with energy consumed by structure 100 to BMS 161, predictive controller 171, and/or remote predictive controller 173. In such embodiments, the device is communicatively coupled to BMS 161, predictive controller 171, and/or remote predictive controller 173 and to conventional utility infrastructure.

In some embodiments, structure 100 includes BMS 161, which can reside locally in computing device 160. In some embodiments, computing device 160 is communicatively coupled to gateway computing device 170. Alternatively or additionally, in some embodiments, computing device 160 is communicatively coupled to remote predictive controller 173, for example via network connections 175 and a remote application programming interface (API) 174.

Generally, larger buildings and structures include a centralized BMS 161, which supervises operation of one or more systems included in structure 100, for example via pre-set schedules and/or via rule-based control (RBC). Thus, in some embodiments, BMS 161 implements different operating schedules (e.g., occupied operation, unoccupied operation, building warm-up, etc.). In such embodiments, BMS 161 can supervise operation of one or more lighting systems associated with structure 100, an HVAC system, local HVAC devices 121, and the like. However, the conventional operation of BMS 161 is according to fixed control methods or schedules, and is incapable of adapting control of one system included in structure 100 to real-time operating conditions of other systems included in structure 100. Thus, controllable loads 180 within structure 100, such as electric vehicle-charging stations, cannot be operated to optimize energy consumption of structure 100 as a whole.

According to various embodiments, a predictive controller can integrate operations of multiple independent systems within structure 100 and across multiple controllable loads associated with structure 100. In this way, the predictive controller can optimize or otherwise improve the energy-consumption performance of structure 100. Further, in some embodiments, the predictive controller can employ the output of various predictive models in order to avoid and/or reduce instances of high power demand by preemptively changing control parameters of one or more systems in anticipation of predicted power use, weather conditions, energy generation, and other events. One embodiment of such a predictive controller is predictive controller 171 included in gateway computing device 170 and another embodiment of such a predictive controller is remote predictive controller 173.

Gateway computing device 170 is a computing device that is disposed within or proximate to structure 100, and, in some embodiments, runs predictive controller 171. As shown, gateway computing device 170 is communicatively coupled to one or more remote computing devices 172 via a network connection 175. In some embodiments, network connection 175 includes a wired connection to one or more information networks, such as the Internet. Alternatively or additionally, in some embodiments, network connection 175 includes a wireless connection to the one or more information networks. Remote computing devices 172 are associated with information sources external to structure 100 that provide pertinent information to predictive controller 171. For example, one or more of remote computing device 172 can be associated with external weather forecast providers, such as the National Weather Service or commercial providers, and provide forecasts of local weather conditions, including temperature, irradiance, wind, etc. In another example, one or more of remote computing device 172 can be associated with a grid signal server that provides grid signals that include demand response signals (including ADR2.0), load aggregator signals, market and utility signal forecasts, and/or forecasts of grid conditions.

According to various embodiments, predictive controller 171 and/or remote predictive controller 173 can integrate operations of multiple independent systems within structure 100 to optimize or otherwise improve the energy-consumption performance of structure 100. Further, in some embodiments, predictive controller 171 and/or remote predictive controller 173 can employ the output of various predictive models in order to avoid and/or reduce instances of high-power demand by structure 100 by preemptively changing control parameters of one or more systems of structure 100 in anticipation of predicted power use, weather conditions, energy generation, and other events. One such embodiment is described below in conjunction with FIGS. 2-7.

Predictive Controller

Figure 2:
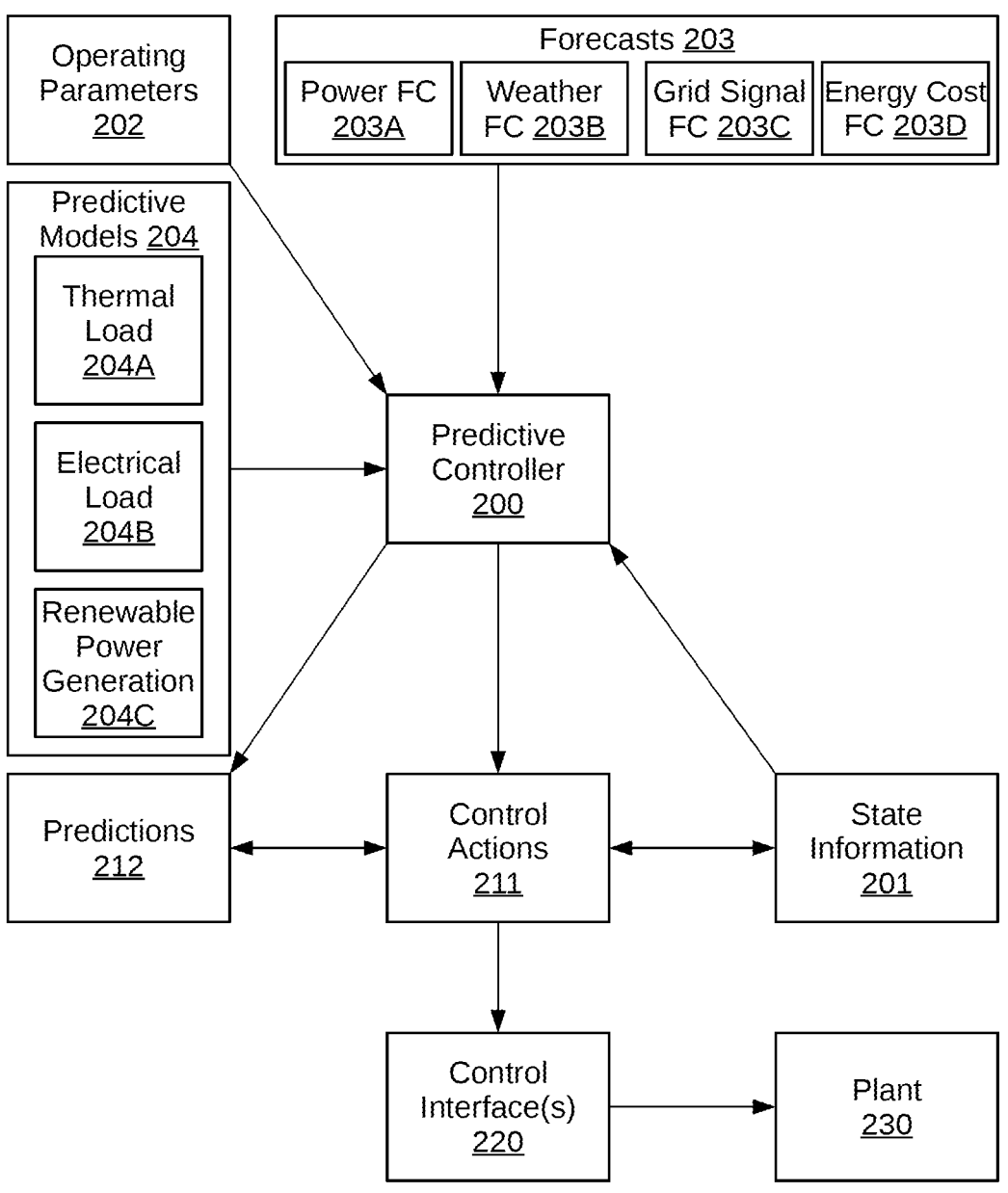
FIG. 2 is an operational diagram of a predictive controller that can be implemented for the structure of FIG. 1, according to various embodiments.

FIG. 2 is an operational diagram of a predictive controller 200 that can be implemented for structure 100, according to various embodiments. As shown, predictive controller 200 receives certain inputs (such as state information 201, operating parameters 202, forecasts 203, and/or predictive models 204) and generates one or more outputs (such as control actions 211 and predictions 212). Based on such inputs, predictive controller 200 determines and sends control actions 211 to a plant 230 via control interfaces 220.

Control actions 211 are the main output of predictive controller 200 and are actions to be implemented by one or more systems and/or devices of structure 100, for example over a future control horizon. Thus, in some instances, a specific control action 211 generated by predictive controller 200 may be directed to behavior of a particular system or device within structure 100 at a future time, and therefore does not result in an immediate action or behavior change by the particular system or device. In some embodiments, control actions 211 can include an indicator of an abstract or high-level action to be performed by a specific system or device included in structure 100. For example, in an instance in which predictive controller 200 has determined that one or more objectives for structure 100 can be met by reducing energy consumption of a particular EV charging station during a specified time interval, a control action 211 for that particular EV charging station includes an indicator value that corresponds to the high-level action: "reduce the current charge-level setpoint of EV charging station #2 by 25% from time T1 to time T2." In another example, in an instance in which predictive controller 200 has determined that one or more objectives for structure 100 can be met by reducing energy consumption of a particular HVAC device 111 in structure-wide HVAC system 110 during a specified time interval, a control action 211 for the HVAC controller corresponding to that particular HVAC device 111 includes an indicator value that corresponds to the high-level action: "deactivate stage 2 cooling from time T1 to time T2" of that particular HVAC device 111. According to various embodiments, the control actions 211 are transmitted to the appropriate system or device through control interfaces 220, which are described below.

Plant 230 represents the relationship between control actions 211 and changes in state information 201 of structure 100. The actuators of plant 230 that contribute to changes in state are controllable devices within structure 100 and/or systems of structure 100. For example, in some embodiments, plant 230 represents the thermal behavior of HVAC zones 120 and/or the power consumption behavior of the various systems included in structure 100. In such embodiments, state information 201 of structure 100 changes in response to control actions 211 and other factors, such as changes in thermal load and energy generation.

Plant 230 can include a variety of controllable equipment that can be controlled by predictive controller 200. Generally, such controllable equipment includes any system or device that has an associated controller or control mechanism that can be communicated with by predictive controller 200. For example, such controllable equipment typically includes Internet-of-things (IoT) and/or some other wired or wireless communication capability that is compatible with control interfaces 220 (described below). The operation of this equipment impacts the cost of utility bills to the customer, performance of the building in response to grid signals, and building operational constraints and occupant comfort constraints. Examples of such controlled equipment include: HVAC equipment, such as rooftop units (RTUs), fan coil units (FCUs), variable air volume (VAV) systems, thermostats, and building management systems (BMSs); lighting devices and systems, such as controlled lighting, including switchable and dimmable lighting; batteries and other energy storage devices, which can be controlled to charge and discharge as needed to control for cost, operations, grid resiliency, and other objectives; EV charging systems, which can be controlled to minimize or otherwise reduce energy costs while meeting the operational requirements for vehicle charge state, and/or to provide grid services; and on/off devices that can either on or off, such as lights, air compressors, and the like.

Control interfaces 220 include device interfaces that enable communication access by predictive controller 200 to devices included in various systems of structure 100. Thus, control interfaces 220 allow control actions 211 to affect devices associated with structure 100. In some embodiments, control interfaces 220 enable communication access to devices included in structure-wide HVAC system 110, sensor/thermostats 121, local HVAC devices 123, power meter 150, and/or controllable devices or sensors included in energy generation system 130, energy system 140, and controllable loads 180. Control interfaces 220 can include one or more of a variety of device interfaces and protocols, such as BACnet, Z Wave, and Zigbee, as well as one or more proprietary interfaces.

In embodiments in which predictive controller 200 resides in an in-building gateway (such as gateway computing device 170 in FIG. 1), control interfaces 220 can receive control actions 211 from predictive controller 200, translate control actions 211 as needed to suitable control signals that are compatible with a targeted device or devices associated with structure 100, and convey the control signals to controllers associated with the targeted device or devices. Alternatively, in embodiments in which predictive controller 200 is implemented as a remote predictive controller (such as remote predictive controller 173 in FIG. 1), control interfaces 220 include cloud interfaces that connect to a targeted device or devices associated with structure 100. In such embodiments, the cloud interfaces may be provided by third-party service providers. In such embodiments, control interfaces 220 can receive control actions 211 from predictive controller 200. Using suitable adapters, control interfaces 220 translate control actions 211 to suitable control signals that are transmitted to the cloud interfaces, which in turn control the targeted in-building device or devices. Embodiments for translation of control actions 211 to control signals and transmission of such control signals to in-building devices are described below in conjunction with FIG. 7.

Control interfaces 220 can include a range of device interfaces that can read device-level information and send control signals that include device-level information to controlled equipment. Thus, control interfaces 220 enable the communication of control actions 211 to controllable systems and devices included in structure 100. Examples of such device interfaces can include BACnet, Modbus, RESTful APIs, various wireless communication protocols, and the like. As a result, predictive controller 100 can interface with and control a variety of device types, including HVAC systems or devices, energy storage systems, EV charging systems, building energy management systems, on/off switchable devices, and the like. In some embodiments, one or more control interfaces 220 can be local to a specific system or device in structure 100. Additionally or alternative, in some embodiments, one or more control interfaces 220 can be accessed remotely.

State information 201 includes measured states and/or other information associated with current and past states of plant 230 that represent measurements of conditions in structure 100 and equipment operating states. In some embodiments, measurements of state information 201 are collected as needed from structure 100 and associated systems within structure 100. In some embodiments, state information 201 is collected at intervals dependent on the type of data and connectivity. As shown, state information 201 is provided to predictive controller 200, which employs state information 201 as inputs to one or more control algorithms for generating control actions 211. In some embodiments, predictive controller 200 employs state information 201 as inputs to one or more predictive models for generating forecasts 203. In some embodiments, state information 201 is gathered by gateway computing device 170. Additionally or alternatively, in some embodiments, state information 201 is gathered via remote APIs 174.

Examples of state information 201 include air temperature and/or humidity values for HVAC zones 120 and/or other rooms or areas of structure 100, operating status of HVAC equipment (e.g., HVAC devices 111 and local HVAC devices 123), electric vehicle (EV) charger status and charge rate, battery state of charge and charge rate of an energy storage system 140, and other equipment-dependent measurements. Further examples of state information include meter load, solar generation, and sensor readings. Meter load information enables adjustments to control algorithms based on total meter load, on which power customers are billed. In some embodiments, meter load is measured frequently, for example on the order of about once per minute. In some embodiments, meter load measurements can also be used to improve certain forecasts 203. Real-time solar generation information enables adjustments to control algorithms based on the total meter load of structure 100, on which power customers are billed. In some embodiments, solar generation is measured frequently, for example on the order of about once per minute. In some embodiments, solar generation measurements can also be used to improve certain forecasts 203. Sensor readings enable adjustments to control algorithms in response to conditions in structure 100. For example, sensor readings can be used to update the state of one or more control algorithms, improve forecasting models, monitor for alert conditions, and the like. Generally, sensor readings are generated by devices and/or sensors associated with structure 100 and can include temperature readings, battery charge level, HVAC operating status, etc.

Operating parameters 202 specify various parameters associated with operation of one or more systems within structure 100, including schedules, temperature constraints for conditioned spaces (e.g., HVAC zones 120), expected charge rates and levels for EV chargers, and the like. Thus, operating parameters 202 act as constraints on the operation of the devices, systems, and other equipment included in structure 100. Examples of such constraints include equipment capabilities, such as minimum and maximum charge capacity of a battery, comfort constraints, such as preferred temperature ranges for occupants, and time constraints on operation, such as schedules specifying occupied and unoccupied temperature ranges. The constraints associated with operating parameters 202 may be hard or soft, thereby allowing for partial constraint violations in some instances. Generally, operating parameters 202 vary depending on the operation of structure 100 and on the devices, systems, and other equipment included in structure 100. For instance, in embodiments in which structure 100 is a facility with air conditioning, operating parameters can include an occupancy schedule and associated temperature constraints for each HVAC zone 120. Further, in some embodiments, control actions 211 generated by predictive controller 200 can modify or violate operating parameters within a range, as needed.

Forecasts 203 include information that enables predictive control of systems and devices in structure 100. In particular, forecasts 203 enable predictive controller 200 to automatically and dynamically generate control actions 211 that optimize or otherwise improve the energy-consuming behavior of structure 100. According to various embodiments, forecasts 203 are employed by predictive controller 200 as feed-forward terms that provide an accurate prediction of certain factors that affect power use of structure 100, such as factors that cannot be controlled by systems of structure 100 but have significant impact on the power use of structure 100. For example, in some embodiments, predictive controller 200 includes or employs one or more forecasts 203 in an objective function to predict future states of state information 201. Generally, in such embodiments, future states of state information 201 are affected both by control actions 211 and by external factors, such as forecasts 203.

In some embodiments, a variety of inputs and forecasting models can be employed to match a particular forecasting model to the type of system for which a forecast 203 is generated. Thus, a forecasting model for solar generation of structure 100 can be a different model than a forecasting model for power use by structure 100. In some embodiments, a forecasting model can be biased to reduce costly errors and/or can provide a range of potential forecasts within a probability distribution. The output of a particular forecasting model can include a set of times and associated power values and/or additional values, such as an uncertainty associated with each value. Such output then serves as input to predictive controller 200. In some embodiments, a forecast 203 can include predictions with sufficiently low uncertainty at a required temporal resolution and with a long enough temporal horizon so that predictive controller 200 can use the forecast 203 to deliver the desired functionality and performance. In some embodiments, the temporal resolution and/or uncertainty of a forecast 203 can vary over the horizon. For example, in some embodiments, a particular forecast 203 can include a high-resolution portion with a temporal resolution of 1-5 minutes and a lower uncertainty close to the time at which the forecast was generated. In such embodiments, the particular forecast can further include a lower-resolution portion with a temporal resolution of tens of minutes to an hour and a higher uncertainty than the high-resolution portion. In some embodiments, forecasts 203 include one or more of the following forecasts: power forecasts 203A, weather forecasts 203B, grid-signal forecasts 203C, and energy cost forecasts 203D.

Power forecasts 203A include a predicted electrical load that cannot be affected by predictive controller 200, and can be used by predictive controller 200 to adjust energy use and demand by structure 100. In some embodiments, power forecasts 203A include such a predicted electrical load over a certain time period into the future, for example on the order of multiple hours or days. In some embodiments, such a predicted electrical load is associated with all electrical equipment served by power meter 150. In other embodiments, power forecasts 203A can include power use on a microgrid system that includes structure 100. In such embodiments, power forecasts 203A enable predictive controller 200 to enhance resilience of the microgrid. In some embodiments, power forecasts 203A are generated by a building-specific electrical load predictive model 204B for structure 100.

Weather forecasts 203B include predicted local weather conditions that can affect energy use and demand by structure 100. In some embodiments, weather forecasts 203B include predicted temperature, irradiance, wind speed and direction, and the like. In some embodiments, weather forecasts 203B are provided by external forecast providers, such as the National Weather Service and/or commercial providers. In some embodiments, weather forecasts 203B are based on a combination of information provided by external forecast providers and information generated by calculations and forecasting algorithms included in predictive controller 200.

Grid-signal forecasts 203C include predicted grid signals that can affect energy availability for use by structure 100 and energy cost when consumed by structure 100. In some embodiments, grid-signal forecasts 203C include demand response signals (including ADR2.0), load aggregator signals, market and utility signal forecasts, and/or forecasts of grid conditions. Thus, grid-signal forecasts 203C enable predictive controller 200 to adjust control algorithms in response to actual grid signals retrieved from a grid signal server and predicted grid signals that are forecast over a future horizon. In some embodiments, grid-signal forecasts 203C are provided from an external source. Alternatively or additionally, in some embodiments, grid-signal forecasts 203C are generated by calculations and forecasting algorithms included in predictive controller 200.

Energy cost forecasts 203D include information regarding the future cost of energy consumed by structure 100, such as predicted rate schedules, market aggregator pricing, real time pricing, locational pricing, and the like. In some embodiments, energy cost forecasts 203D include non-energy cost forecasts, such as carbon emission and/or other pollution prices. Energy cost forecasts 203D enable predictive controller 200 to adjust control algorithms in response to predicted costs for energy consumed by structure 100 and/or emissions associated with such energy.

Predictive models 204 include one or more building-specific predictive models that represent the behavior and performance of structure 100 and equipment in structure 100, such as the cooling capacity and efficiency of an air-conditioning unit. Thus, predictive models 204 are constructed for a particular structure 100 based on information associated with that particular structure 100, such as the operation of that particular structure 100 and the specific devices, systems, and power loads associated with that particular structure 100. Generally, predictive models 204 are constructed from static information, such as manufacturer specifications, and dynamically collected data, such as historical power consumption data and temperature measurements. In this way, the behavior of plant 230 can be accurately and dynamically characterized in an automated fashion. In some embodiments, predictive controller 200 employs one or more predictive models 204 to determine the combined effect on plant 230 of controller actions 211 and of disturbances, (e.g., uncontrolled inputs, such as forecasts 203). Further, in some embodiments, predictive controller 200 employs one or more predictive models 204 to predict the time evolution of the behavior of structure 100. In some embodiments, predictive models 204 include a thermal load predictive model 204A, an electrical load predictive model 204B, and/or a renewable power generation predictive model 204C, among others.

In some embodiments, thermal load predictive model 204A is employed to predict the temperature evolution of structure 100 in response to weather, occupancy, solar radiation, activation/deactivation of HVAC systems, and/or other factors. In some embodiments, thermal load predictive model 204A can be based on factors such as the heat capacitance of conditioned spaces within structure 100, the thermal resistance of such conditioned spaces to other zones or conditioned spaces, and operating models of equipment included in structure 100, such as cooling capacity and energy consumption of HVAC devices 111 and local HVAC devices 123.

In some embodiments, electrical load predictive model 204B is employed to predict behavior of controlled equipment and/or to infer the power demand of equipment in response to control actions 211. In some embodiments, electrical load predictive model 204B can be based on factors such as zone temperatures predicted by thermal load predictive model 204A, energy consumption of HVAC devices 111 and local HVAC devices 123, operating models of other equipment included in structure 100, such as loads 122 in HVAC zones 120, EV arrival and departure behavior, occupancy and preference models, and the like.

In some embodiments, renewable power generation predictive model 204C is employed to predict renewable power generation. In some embodiments, renewable power generation predictive model 204C can be based on site-specific factors, such as weather forecasts 203B and/or historical real-time solar generation information for a renewable energy generation system associated with structure 100, such as energy generation system 130 in FIG. 1.

Predictions 212 are generated by predictive controller 200 in addition to control actions 211 in some embodiments. In such embodiments, predictions 212 include predictions of future values for state information 201. For example, in some embodiments, predictions 212 include equipment operating states, such as power consumption, and facility states, such as zone temperatures. Predictions 212 can be used to tune one or more of the control algorithms and models of predictive controller 200 and predictive models 204.

Predictive controller 200 controls energy and power usage in structure 100. More specifically, predictive controller 200 generates control actions 211 so that power use is controlled to meet or approach one or more objectives. Generally, predictive controller 200 generates control actions 211 subject to operational requirements and constraints of structure 100, such as operating parameters 202. Examples of such power use objectives include reducing operating costs of one or more systems associated with structure 100, maintaining or enhancing comfort and/or convenience in specific HVAC zones 120, and minimizing or otherwise reducing emissions associated with the energy consumed by structure 100.

In some embodiments, predictive controller 200 minimizes an objective function to achieve the one or more objectives for structure 100. For example, in some embodiments, predictive controller 200 minimizes an objective function over a future horizon, such as 6 hours or 24 hours into the future. In some embodiments, the objective function that predictive controller 200 minimizes quantifies economic or financial cost. Alternatively or additionally, in some embodiments, the objective function that predictive controller 200 minimizes quantifies environmental cost (e.g., based on emission of pollutants associated with energy consumed by structure 100). Alternatively or additionally, in some embodiments, the objective function that predictive controller 200 minimizes quantifies comfort (e.g., based on measured values indicating occupant discomfort). Alternatively or additionally, in some embodiments, the objective function that predictive controller 200 minimizes quantifies performance (e.g., based on measured values indicating how highly charged EV batteries are during a specific time interval). Alternatively, in some embodiments, predictive controller 200 does not minimize an objective function to achieve the one or more objectives for structure 100, and instead achieves such objectives via one or more other optimal control techniques. For example, in some embodiments, predictive controller 200 achieves the one or more objectives for structure 100 via a nonlinear control scheme.

In some embodiments, predictive controller 200 can employ multiple objective functions to achieve the multiple objectives for structure 100. In such embodiments, multi-objective optimization can be used to minimize a combination of factors, such as finding solutions that minimize economic cost and carbon emissions while maximizing occupant comfort. Cost factors that can affect the one or more objective functions employed by predictive controller 200 include time-varying electricity prices, utility rate tariffs, carbon prices, and/or the like. One embodiment of predictive controller 200 is described below in conjunction with FIG. 3.

Figure 3:
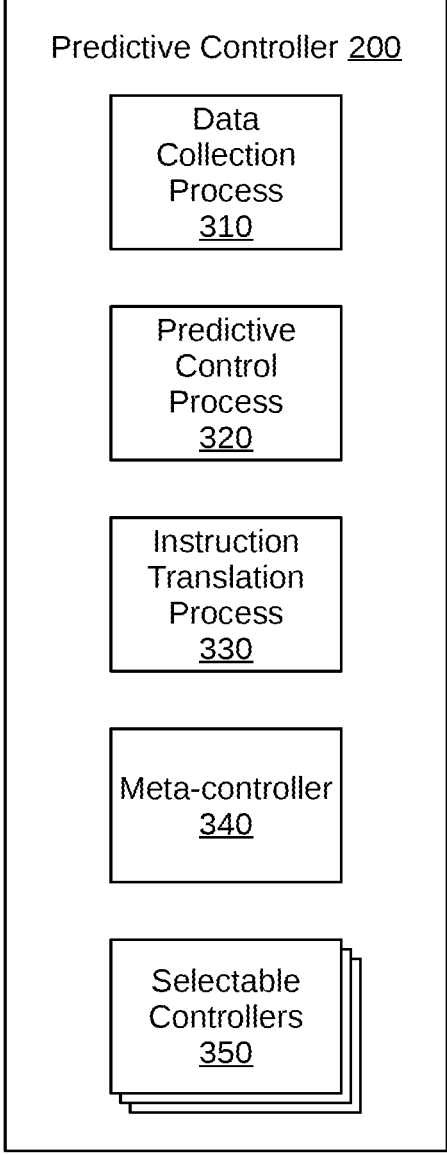
FIG. 3 is a more detailed illustration of the predictive controller of FIG. 2, according to various embodiments.

FIG. 3 is a more detailed illustration of predictive controller 200, according to various embodiments. In some embodiments, operation of predictive controller 200 generates and transmits control actions 201 in three phases: a data collection phase, a control action generation phase, and a control action translation and transmission phase. In some embodiments, these phases are executed synchronously, and in other embodiments, these phases are executed asynchronously. Generally, under asynchronous execution, the most recent available output from each phase can be used by predictive controller 200. To implement the above phases, the embodiment of predictive controller 200 shown in FIG. 3 includes a data collection process 310, a predictive control process 320, an instruction translation process 330, a meta-controller 340, and a plurality of selectable controllers 350.

Data Processes

In data collection process 310, predictive controller 200 receives and/or collects sensor readings, such as state information 201, and predictions 212. One embodiment of data collection process 310 is described below in conjunction with FIG. 4.

FIG. 4 sets forth a flowchart of method steps for performing data collection process 310, according to various embodiments. Although the method steps are described in conjunction with the structure of FIGS. 1-3, persons skilled in the art will understand that any system configured to perform the method steps, in any order, is within the scope of the embodiments.

As shown, a computer-implemented method 400 begins at step 401, where predictive controller 200 collects or receives sensor measurements from structure 100. As noted previously, predictive controller 200 can be communicatively coupled to sensors and controllable devices associated with structure 100 directly, via BMS 161, and/or via remote APIs 174. In some embodiments, predictive controller 200 also collects or receives predictions 212 that have been determined.

In step 402, predictive controller 200 updates state information 201 based on sensor measurements received in step 401. In some embodiments, predictive controller 200 accesses sensor measurements stored in a historical database 410 to generate and/or update state information 201 in step 402. In step 403, predictive controller 200 stores the sensor measurements received in step 401, for example by uploading the sensor measurements in historical database 410 of a cloud server or other accessible computing device. In embodiments in which predictive controller 200 resides in an in-building gateway (such as gateway computing device 170 in FIG. 1), predictive controller 200 can store the sensor measurements received in step 401 in a local repository (not shown) and/or in historical database 410 of a cloud server.

In step 404, predictive controller 200 pauses for a suitable time interval, then computer-implemented method 400 returns to step 401 and predictive controller 200 collects or receives additional sensor measurements from structure 100. In some embodiments, the time interval can vary depending on different sensors. Thus, in such embodiments, sensors that update more frequently (e.g., once per minute) than other sensors (e.g., once every ten minutes), and therefore can be polled more frequently in computer-implemented method 400, and steps 401-404 can be performed in parallel for different sensors. Alternatively or additionally, in some embodiments, the time interval can be selected based on a targeted control loop frequency of computer-implemented method 400.

Predictive Control Process

In predictive control process 320, predictive controller 200 determines a suitable controller and, via the controller, generates one or more control actions for that controller. In some embodiments, predictive controller 200 performs predictive control process 320 for each system and/or device associated with structure 100. Thus, in such embodiments, predictive controller 200 performs a separate predictive control process 320 for a selected system or device, such as structure-wide HVAC system 110 and/or each of HVAC controllers 112, energy generation system 130, energy storage system 140, and/or each controllable load 180. One embodiment of predictive control process 320 is described below in conjunction with FIG. 5.

FIG. 5 sets forth a flowchart of method steps for performing predictive control process 320 for a selected system or device associated with structure 100, according to various embodiments. Although the method steps are described in conjunction with the structure of FIGS. 1-3, persons skilled in the art will understand that any system configured to perform the method steps, in any order, is within the scope of the embodiments.

As shown, a computer-implemented method 500 begins at step 501, where predictive controller 200 is initialized. In step 502, predictive controller 200 loads appropriate data associated with the selected system or device. Examples of appropriate data include operating parameters 202 for the selected system or device, predictions 212 that affect operation of the selected system or device, and the most recently updated state information 201 associated with the selected system or device, which can include both current and historical state information.

In step 503, predictive controller 200 initializes the appropriate models with the data loaded in step 502, including state information 201 and operating parameters 202. In step 504, predictive controller 200 determines control actions 211 for the selected system or device that meet the one or more control objectives for the selected system or device, for example using a specific controller or control algorithm associated with the selected system or device. The specific controller can use any control method suitable for the selected system or device, such as open-loop control, closed-loop control, predictive control, or other control methods. Examples of such controllers include rule-based control (RBC), model predictive control (MPC), neural networks, reinforcement learning, ensemble methods, and hybrid methods, such as an MPC controller that is employed in conjunction with a neural network.

In step 505, predictive controller 200 determines whether control actions 211 are successfully computed. For example, in some embodiments, a controller currently in use by predictive controller 200 for determining control actions for the selected system or device cannot generate an output, for example when specific input data are unavailable. Thus, when the specific input data for the selected system or device are currently not available to predictive controller 200, the controller currently in use by predictive controller 200 faults and is unsuccessful in computing control actions 211 for the selected system or device. In such instances, computer-implemented method 500 proceeds to step 510. Alternatively, when predictive controller 200 successfully computes control actions 211, computer-implemented method 500 proceeds to step 506.

Step 506 is performed in response to predictive controller 200 successfully computing control actions 211 for the selected system or device. In step 506, predictive controller 200 sends the control actions 211 to a suitable receiver capable of performing instruction translation process 330, which is described below in conjunction with FIG. 7. In some embodiments, such a receiver can be a time series database or other component that can send the control actions to the selected system or device. Alternatively, predictive controller 200 performs instruction translation process 330. Upon completion of step 505, computer-implemented method 500 proceeds to step 520 and terminates.

Step 510 is performed in response to predictive controller 200 failing to successfully compute control actions 211 for the selected system or device. In step 510, predictive controller 200 determines whether there is a recovery controller available, such as an alternative controller, set of parameters, objective, and/or algorithm that can be used in computer-implemented method 500 for the selected system or device. When predictive controller 200 determines there is a recovery available, computer-implemented method 500 proceeds to step 511; when predictive controller 200 determines there is no recovery available, computer-implemented method 500 proceeds to step 520 and terminates.

In some embodiments, in step 510 predictive controller 200 determines there is a recovery available when a different control algorithm can be employed to compute control actions 211 for the selected system or device. In some embodiments, predictive controller 200 determines a control algorithm can be employed to compute control actions 211 based on currently available state information 201 or lack thereof. For example, in one instance, predictive controller 200 determines there is insufficient state information 211 available for a prediction-based or feed-forward control algorithm to compute control actions 211 for controlling the selected system or device, but there is a rules-based control algorithm available for controlling the selected system or device for which sufficient state information 201 is available. Therefore, in such an instance, predictive controller 200 determines there is a recovery available, and computer-implemented method 500 proceeds to step 511.

In step 511, predictive controller 200 attempts the recovery that is determined to be available in step 510. For example, in some embodiments, predictive controller 200 selects a replacement controller or control algorithm for computing control actions 211. Computer-implemented method 500 then returns to step 501, and the selected replacement control algorithm is initialized for computing control actions 211.

Generally, for a selected system or device, predictive control process 320 is executed periodically and at intervals of sufficient frequency to achieve the one or more control objectives associated with the selected system or device. For instance, in some embodiments, predictive control process 320 is performed once every minute, once every 15 minutes, and the like.

Meta-Controller

In some embodiments, as part of predictive control process 320, meta-controller 340 selects a controller or control algorithm for the selected system or device. In some embodiments, meta-controller 340 selects the controller or control algorithm from a set of selectable controllers 350. In such embodiments, meta-controller 340 enables predictive controller 200 to a selected system or device with greater flexibility than prior art approaches. In particular, meta-controller 340 enables predictive controller 200 to control a selected system or device with varying levels of sophistication at different times, depending on the currently available state information 201 that affects operation of the selected system or device. Thus, in such embodiments, meta-controller 340 can select a simple controller that has few or no input data requirements (e.g., a rules-based controller) when little or no historical state information 201 is available and a more complex controller that has greater input data requirements (e.g., a model predictive controller) when sufficient historical state information 201 is available. One embodiment of meta-controller 340 is described below in conjunction with FIG. 6.

Figure 6:
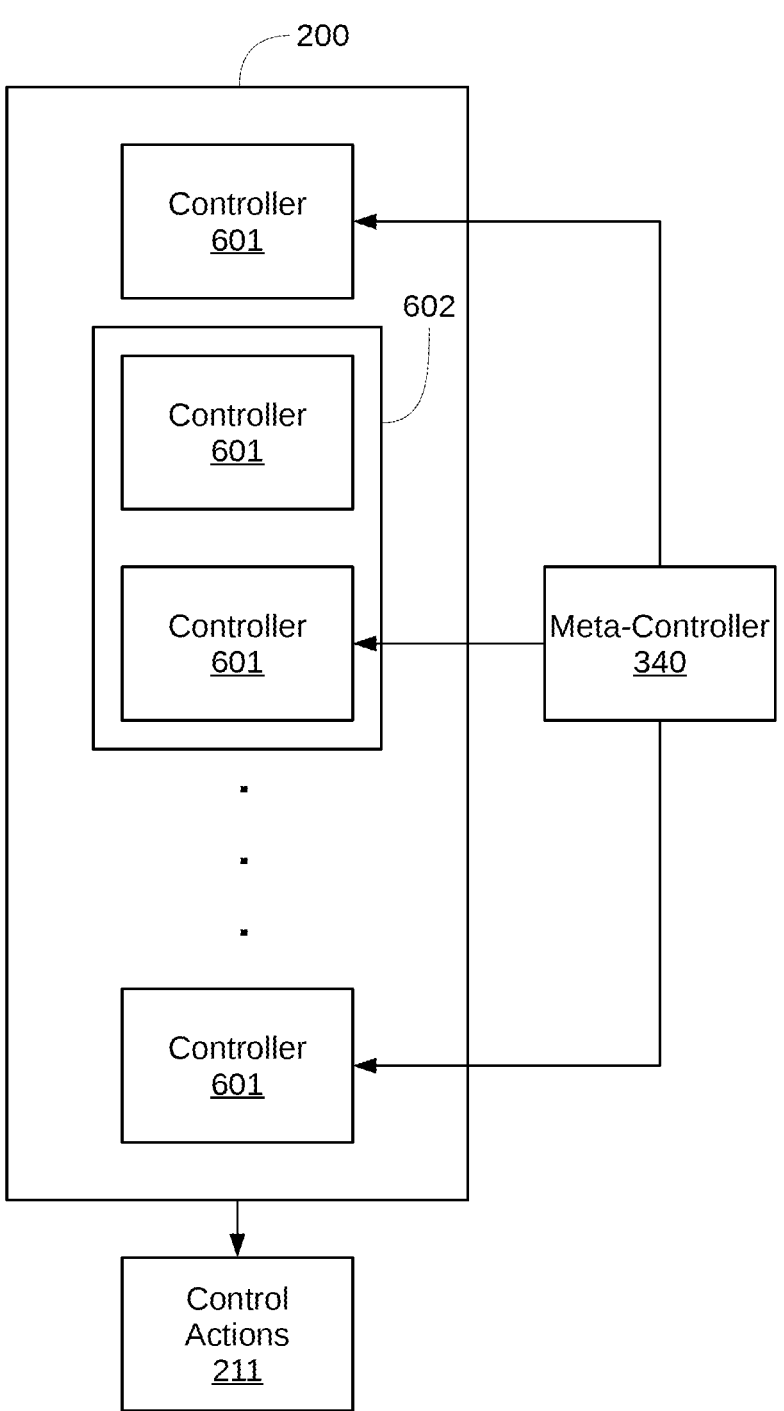
FIG. 6 is an operational diagram of a meta-controller that is implemented within the predictive controller of FIG. 3, according to various embodiments.

FIG. 6 is an operational diagram of a meta-controller 340 that is associated with predictive controller 200, according to various embodiments. Meta-controller 340 can provide fault tolerance for predictive control process 320, by selecting an alternative or replacement controller to generate control actions 211 when a primary (or best available) controller 601 fails to generate control actions 211. As shown, meta-controller 340 can select a replacement controller from a set of controllers 601. In some embodiments, meta-controller 340 prioritizes selection of a replacement controller 601 for the primary controller 601 based on a type of HVAC zone 120 served by the system or device and/or on a type of load(s) 122 associated with the HVAC zone 120.

Each controller 601 can operate using various control methods to generate one or more control actions 211 appropriate for the devices or system controlled by that controller. The various control methods can include open-loop control, closed-loop control, predictive control, or other control methods. In some embodiments, controllers 601 can include RBC controllers, MPC controllers, neural network-based controllers, reinforcement learning-based controllers, hybrid controllers, and the like. Generally, each controller 601 receives inputs appropriate to that type of controller (e.g., state information 201 and operating parameters 202), and generates control actions 211 appropriate for the device or system controlled by that controller. In some embodiments, one or more of controllers 601 can control a system or device based on situational parameters, such as preventing zone temperature violations in high-priority zones (e.g., refrigeration for food or air conditioning of critical areas) whenever possible but allowing certain zone temperature violations is lower-priority zones in certain situations. Alternatively or additionally, in some embodiments, one or more of controllers 601 can prioritize operation of certain systems or devices over other systems or devices in certain situations. For example, in some instances, a controller 601 may reduce EV charging during a time period in which other systems have high energy demand.

In some embodiments, meta-controller 340 enables an ensemble of control methods to be implemented for a particular system or device associated with structure 100. Thus, at different times, different control methods can be used for the same system or device. Alternatively or additionally, in some embodiments, multiple control methods can be mixed in hybrid configurations, and can be selected by meta-controller 340 using automatic algorithms. Consequently, meta-controller 340 can match an appropriate control method to a specific system or device based on various factors. Examples of such factors include the type of facility or zone that is associated with the system or device, the type of equipment included in the system or device, the specific inputs that are currently available, the objective function(s) that is associated with the system or device or with structure 100 as a whole, and the like. Therefore, control of a specific system or device associated with structure 100 can be modified dynamically based on real-time conditions, such as availability of state information 201, changes in operating conditions, specific information included in forecasts 203, and the like. As a result, liability of the control of a specific system or device is increased.

It is noted that a particular controller 601 may be better suited to certain circumstances than other controllers 601. Thus, in some embodiments, meta-controller 340 can select a more suitable controller for a specific system or device. For example, in many instances, for control of a specific system or device, an MPC-based controller can outperform an RBC-based controller in minimizing an objective function. However, in other instances, an RBC-based controller may outperform an MPC-based controller, such as when model uncertainty is sufficiently large. In such instances, the model uncertainty may be due to insufficient data being available (for example due to a lack of historical state information 201) to develop or parameterize predictive models. For example, such conditions are typically present in a new installation of structure 100, because there is insufficient time to gather the necessary sensor data. In some instances, an RBC-based controller can also outperform an MPC-based controller when a quality of sensor data is sufficiently low that the use of an accurate predictive model is prevented.

In some embodiments, meta-controller 340 can enable the use of a so-called "ensemble approach" for controlling a specific system or device, in which multiple controllers 601 are run simultaneously or sequentially to generate separate control actions 211 for the same specific system or device. For example, in some circumstances, a particular MPC-based controller 601 may fail to generate control actions 211, for example due to encountering solver infeasibility issues, losing access to external data sources, or the like. In some embodiments, meta-controller 340 runs multiple controllers 601 for a specific system or device in parallel and, when a primary controller fails to generate control actions 211 for the specific system or device, meta-controller 340 selects the control actions 211 generated by another of the multiple controllers 601. In such embodiments, the reliability of control of the specific system or device is increased, even when control degrades relative to the primary controller 601. In such embodiments, meta-controller 340 can employ various approaches to determine which controller 601 to select when the primary controller 601 fails to generate control actions 211. In some embodiment, meta-controller 340 can base the selection of the replacement controller 601 based on an objective function associated with control of the specific system or device, one or more environmental factors, the availability of state information 201 associated with the specific system or device, and the like.

In some embodiments, meta-controller 340 selects a more suitable controller 601 for a specific system or device than a current controller 601 based on other factors. For example, for a particular structure 100 and/or system, the primary controller 601 may have a prohibitively high computational cost, be too time-consuming to parameterize for use in the particular structure 100, and/or require too much time to generate control actions 211 for the system or device being controlled, among other reasons. In some embodiments, meta-controller 340 can select a replacement controller 601 for the primary controller 601, where the replacement controller performs better than the primary controller 601 with respect to one or more of these metrics. For example, in some instances, determining control actions 211 for a large building or complex site can require complex models that require too much runtime, such as more time than is available to manage demand changes associated with the building. In some embodiments, meta-controller 340 selects a hybrid controller 602 that is based on multiple controllers 601 and can address the shortcomings of the primary controller 601. Alternatively or additionally, in some embodiments, meta-controller 340 selects a set of hierarchical controllers 601 to address the shortcomings of the primary controller 601. In such embodiments, meta-controller 340 selects a high-level controller 601 to operate over a long, but coarse, prediction and control horizon, and a separate controller 601 that uses the output of the high-level controller 601 for reference tracking and/or as constraints to execute a lower-level but higher resolution control method. In such embodiments, the high-level controller 601 generally executes a different control method than that of the lower-level controller.

In some embodiments, meta-controller 340 can simplify deployment of predictive controller 200 by selecting a controller 601 that is most appropriate to a particular facility or operating condition. Further, in some embodiments, meta-controller 340 enables dynamic reconfiguration of the control of one or more systems or devices associated with structure 100. For example, disturbances caused by user-initiated changes and/or external factors such as forecasts 203 can be compensated for by selection of a different controller 601 for the one or more systems or devices as appropriate.

Instruction Translation Process

In some embodiments, predictive controller 200 generates control actions 211 that capture a specific high-level control action for a selected system or device, e.g., "activate stage 1 cooling of an HVAC unit." However, such abstract forms of commands are generally not usable for control of a selected system or device. Instead, systems and devices of structure 100 are typically controlled via control signals that indicate setpoint values, mode settings, on/off states, and the like. According to various embodiments, one or more control actions 211 are translated from the domain language of the controller selected by predictive controller 200 into a form more suitable for control of a system or device included in structure 100. Thus, in such embodiments, upon receipt of the translated signals, a controller associated with the system or device causes the system or device to behave in accordance with the one or more control actions 211. For example, in one instance, a controller 601 in FIG. 6 generates control actions 211 that capture a specific high-level control action for a selected system or device, e.g., "activate stage 1 cooling of the HVAC unit." In such an instance, instruction translation process 330 of FIG. 3 generates one or more control signals of a suitable format that cause a thermostat associated with the HVAC unit to activate the HVAC unit appropriately. One embodiment of instruction translation process 330 is described below in conjunction with FIG. 7.

FIG. 7 sets forth a flowchart of method steps for performing instruction translation process 330, according to various embodiments. Although the method steps are described in conjunction with the structure of FIGS. 1-6, persons skilled in the art will understand that any system configured to perform the method steps, in any order, is within the scope of the embodiments. In the embodiment illustrated in FIG. 7, portions of instruction translation process 330 are performed by predictive controller 200 and portions of instruction translation process 330 are performed by one or more control interfaces 220.

As shown, a computer-implemented method 700 begins at step 701, where a control interface 220 transmits to predictive controller 200 a request for control instructions for a particular system or device included in structure 100. For example, in some embodiments, a command sender function running in gateway computing device 170 or in a remote computing device 172 determines what systems or devices associated with structure 100 require control signals or other instructions. Based on that determination, control interface 220 transmits the request to predictive controller 200. In step 702, predictive controller 200 receives the request generated in step 701.

In step 703, predictive controller 200 select a primary controller, for example from a set of controllers 601 that are available to predictive controller 200. In some embodiments, meta-controller 340 selects the primary controller, for example based on one or more of the various factors described above in conjunction with FIG. 6. In embodiments in which an ensemble control method or a hybrid control method are employed by predictive controller 200 for the selected system or device, in step 703, meta-controller 340 selects multiple controllers rather than a single primary controller.

In step 704, predictive controller 200 generates one or more control actions 211 for the particular system or device via the primary controller selected in step 703. Generally, control actions 211 are based on state information 201, operating parameters 202, forecasts 203, and/or predictions 212. In embodiments in which an ensemble control method or a hybrid control method are employed for the selected system or device, in step 704, predictive controller 200 uses each of multiple selected controllers to generate one or more control actions 211 for the selected system or device. Thus, in such embodiments, multiple sets of one or more control actions 211 are generated for the same selected system or device.

In step 705, predictive controller 200 determines whether the selected controller or controllers successfully generate the requisite one or more control actions 211 for the selected system or device. If no, computer-implemented method 700 proceeds to step 711; if yes, computer-implemented method 700 proceeds to step 706.

In step 706, predictive controller 200 translates the control actions 211 generated by the one or more controllers into control instructions that are appropriate for interpretation by control interface 220. For example, in an embodiment, predictive controller 200 translates control actions 211 for the selected system or device to one or more specific setpoint values, equipment mode settings, and/or equipment on/off states. When the specific setpoint values, equipment mode settings, and/or equipment on/off states are received by a controller associated with the selected system or device, the controller causes the selected system or device to behave in accordance with the one or more control actions 211. Thus, in such embodiments, control actions 211 can include an indicator of a targeted result, while the control instructions can include an indicator of a specific device setting or other value that can cause the device to achieve the targeted result.

In step 707, predictive controller 200 returns the control instructions to control interface 220. In step 708, control interface 220 receives the control instructions from predictive controller 200. In step 709, control interface 220 translates or otherwise converts the control instructions received in step 708 for the selected system or device into control signals that can be received and acted upon by the selected system or device. For example, in some embodiments, control interface 220 converts the received control instructions into one or more BACnet control messages or other control signals that are specifically formatted for changing the operation of the selected system or device. For example, the BACnet control message may include a temperature setpoint on a specific zone controller, a charge level setpoint of an EV battery, and the like.

In step 710, control interface 220 transmits the control signals to the appropriate system or device included in structure 100 over appropriate communication links. In some embodiments, control interface 220 can be communicatively coupled to sensors and controllable device associated with structure 100 directly, via BMS 161, and/or via remote APIs 174.

Step 711 is performed in response to predictive controller 200 determining that the selected controller or controllers fails to successfully generate the requisite one or more control actions 211 for the selected system or device. In step 711, predictive controller 200 selects another controller for the selected system or device. In some embodiments, predictive controller 200 selects the controller that has the next-highest priority. For example, in some embodiments, a lower-complexity controller is selected in step 711 when a more complex controller fails to converge or is too computationally expensive to generate control actions 211 within a specified time interval. In such embodiments, the more complex controller may be a model-based controller while the lower-complexity controller may be based on a model-free control method that uses a simple algorithm to, for example, allocate an energy budget across zones during each iteration of a control loop.

Exemplary Computing Device

Figure 8:
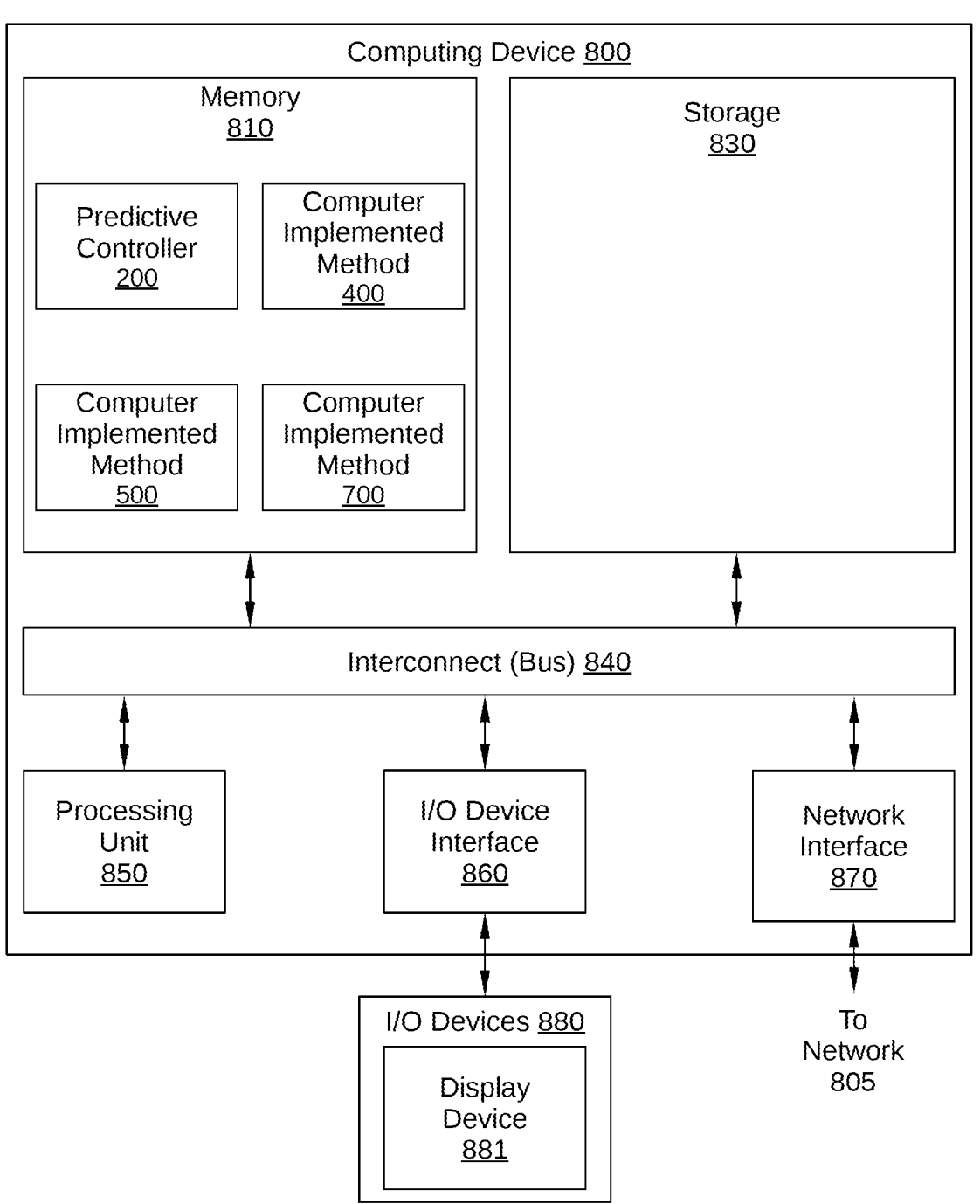
FIG. 8 is a block diagram of a computing device configured to implement one or more aspects of the various embodiments.

FIG. 8 is a block diagram of a computing device 800 configured to implement one or more aspects of the various embodiments. Thus, computing device 800 can be a computing device associated with structure 100, remote computing devices 172, and/or remote predictive controller 173. Computing device 800 may be a desktop computer, a laptop computer, a tablet computer, or any other type of computing device configured to receive input, process data, generate control signals, and display images. Computing device 800 is configured to perform operations associated with predictive controller 200, computer-implemented method 400, computer-implemented method 500, computer-implemented method 700, and/or other suitable software applications, which can reside in a memory 810. It is noted that the computing device described herein is illustrative and that any other technically feasible configurations fall within the scope of the present disclosure.

As shown, computing device 800 includes, without limitation, an interconnect (bus) 840 that connects a processing unit 850, an input/output (I/O) device interface 860 coupled to input/output (I/O) devices 880, memory 810, a storage 830, and a network interface 870. Processing unit 850 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 850 may be any technically feasible hardware unit capable of processing data and/or executing software applications, including processes associated with predictive controller 200, computer-implemented method 400, computer-implemented method 500, and/or computer-implemented method 700. Further, in the context of this disclosure, the computing elements shown in computing device 800 may correspond to a physical computing system (e.g., a system in a data center) or may be a virtual computing instance executing within a computing cloud.

I/O devices 880 may include devices capable of providing input, such as a keyboard, a mouse, a touch-sensitive screen, and so forth, as well as devices capable of providing output, such as a display device 881. Additionally, I/O devices 880 may include devices capable of both receiving input and providing output, such as a touchscreen, a universal serial bus (USB) port, and so forth. I/O devices 880 may be configured to receive various types of input from an end-user of computing device 800, and to also provide various types of output to the end-user of computing device 800, such as one or more graphical user interfaces (GUI), displayed digital images, and/or digital videos. In some embodiments, one or more of I/O devices 880 are configured to couple computing device 800 to a network 805.

Memory 810 may include a random access memory (RAM) module, a flash memory unit, or any other type of memory unit or combination thereof. Processing unit 850, I/O device interface 860, and network interface 870 are configured to read data from and write data to memory 810. Memory 810 includes various software programs that can be executed by processor 850 and application data associated with said software programs, including predictive controller 200, computer-implemented method 400, computer-implemented method 500, and/or computer-implemented method 700.

In sum, the various embodiments described herein integrate operations of multiple independent systems within a structure to optimize or otherwise improve the energy-consumption performance of the structure. Further, the disclose techniques can employ the output of various predictive models to avoid and/or reduce instances of high power demand by preemptively changing control parameters of one or more systems in anticipation of predicted power use, weather conditions, energy generation, and other events.

At least one technical advantage of the disclosed techniques relative to the prior art is that the disclosed techniques enable control of energy use in a structure across a plurality of systems and controllers. As a result, control of the various systems in a structure can be coordinated for optimal energy use, such as a heating, ventilation, and air conditioning (HVAC) system, an electrical vehicle charging system, renewable energy generation, on-site energy storage, and the like. Another technical advantage of the disclosed techniques is that a site-specific adaptive control process for energy use can be automatically implemented for a structure without the need for complex commissioning procedures, such as manual on-site measurements and energy-use data collection, or the development of a site-specific energy-use model that is programmed on a building-by-building bases. Unlike conventional approaches that attempt to coordinate the control of energy use of multiple systems in a structure, the adaptive control process of the disclosed techniques is adaptive, and therefore can modify control of one or more systems in a structure to compensate for and respond to changes in the energy-use behavior of the structure. These technical advantages provide one or more technological advancements over prior art approaches.

1. In some embodiments, a computer-implemented method for controlling a plurality of systems included within one or more structures includes: selecting a first controller from a set of multiple of controllers; with the first controller, determining a control action for a device included in a first system within the one or more structures based on current state information associated with the one or more structures and forecast information; and transmitting a control signal based on the control action to the device.

2. The computer-implemented method of clause 1, further comprising generating at least one predicted value for future state information based on the current state information associated with the one or more structures and the forecast information.

3. The computer-implemented method of clauses 1 or 2, wherein the control action is further based on the at least one predicted value for the future state information.

4. The computer-implemented method of any of clauses 1-3, wherein the control action for the device is determined based on a first controller that is selected from a set of different controllers.

5. The computer-implemented method of any of clauses 1-4, further comprising, prior to transmitting the control signal to the device, translating the control action for the device into control instructions that are interpretable by a control interface that is communicatively coupled to the device.

6. The computer-implemented method of any of clauses 1-5, further comprising translating, by the control interface, the control instructions into the control signal.

7. The computer-implemented method of any of clauses 1-6, wherein the control instructions include at least one of a setpoint value, an equipment mode setting, or an equipment on/off state.

8. The computer-implemented method of any of clauses 1-7, wherein the control action is directed to behavior of the device at a future time and does not result in an immediate behavior change by the device.

9. The computer-implemented method of any of clauses 1-8, wherein the control action for the device is determined further based on a control action for a device included in a second system within the one or more structures.

10. The computer-implemented method of any of clauses 1-9, further comprising: determining the control action for the device included in the first system based on at least one control objective associated with the one or more structures; and determining the control action for the device included in the second system based on the at least one control objective.

11. The computer-implemented method of any of clauses 1-10, wherein a portion of the current state information is associated with the second system within the one or more structures.

12. The computer-implemented method of any of clauses 1-11, wherein determining the control action for the device is further based on at least one control objective associated with the one or more structures.

13. The computer-implemented method of any of clauses 1-12, wherein the control objective comprises at least one of an economic cost associated with the one or more structures, an environmental cost associated with the one or more structures, a quantification of occupant comfort associated with the one or more structures, or a quantification of performance associated with the device or system in which the device is included.

14. The computer-implemented method of any of clauses 1-13, further comprising generating the forecast information prior to determining the control action.

15. The computer-implemented method of any of clauses 1-14, wherein the forecast information is generated via a forecasting model.

16. In some embodiments, a non-transitory computer readable medium includes a set of instructions which, in response to execution by a processor of a computer system, cause the processor to perform the steps: selecting a first controller from a set of multiple of controllers; with the first controller, determining a control action for a first device included in a first system within one or more structures based on current state information associated with the one or more structures and forecast information; and transmitting a control signal based on the control action to the first device.

17. The non-transitory computer readable medium of clause 16, wherein the forecast information includes at least one of power generation forecast information, weather forecast information, grid-signal forecast information, or energy cost forecast information.

18. The non-transitory computer readable medium of clauses 16 or 17, wherein the steps further include determining the power generation forecast information based at least in part on the current state information associated with the one or more structures.

19. The non-transitory computer readable medium of any of clauses 16-18, wherein the steps further include, after transmitting the control signal based on the control action to the first device, selecting a second controller from the set of multiple of controllers based on current state information associated with the one or more structures and additional state information associated with the one or more structures, wherein the second controller has a greater data input requirement than the first controller.

20. The non-transitory computer readable medium of any of clauses 16-19, wherein the steps further include: selecting a second controller from the set of multiple of controllers; with the second controller, determining a control action for a second device included in a second system within one or more structures based on current state information associated with the one or more structures and forecast information; and transmitting a control signal based on the control action for the second to the second device.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. An environmental control unit for a structure wherein the control unit processes a computer-implemented method for controlling a plurality of systems within one or more structures, the method comprising:

selecting a first controller from a set of multiple controllers wherein the first controller is a predictive controller wherein the predictive controller is capable of integrating operations of independent systems within a structure and across multiple structures;

with the first controller, determining a control action for a device included in a first system within the one or more structures based on current state information associated with the one or more structures and forecast information wherein a meta controller within the first controller evaluates the suitability of the first controller for communication with the first system such that in the event the first controller is not suitable a replacement first controller is selected for communication with the first system;

with the first controller or replacement first controller, transmitting a control signal based on the control action to the device thereby controlling the output of the device; and selecting at least one subsequent controller from the set of multiple controllers to determine a separate control action in parallel with the first controller or replacement first controller, wherein the steps further include, after transmitting the control signal based on the control action to the first device, selectin a second controller from the set of multiple of controllers based on current state information associated with the one or more structures and additional state information associated with the one or more structures, wherein the second controller has a greater data input requirement than the first controller.

2. The control unit of claim 1, wherein the control unit generates at least one predicted value for future state information based on the current state information associated with the one or more structures and the forecast information.

3. The control unit of claim 2, wherein the control action is further based on the at least one predicted value for the future state information.

4. The control unit of claim 1, wherein the control action for the device is determined based on the first controller that is selected from a set of different controllers.

5. The control unit of claim 1, wherein the control unit, prior to transmitting the control signal to the device, translates the control action for the device into control instructions that are interpretable by a control interface that is communicatively coupled to the device.

6. The control unit of claim 5, wherein the control unit translates, by the control interface, the control instructions into the control signals.

7. The control unit of claim 5, wherein the control instructions include at least one of a setpoint value, an equipment mode setting, or an equipment on-off state.

8. The control unit of claim 1, wherein the control action is directed to behavior of the device at a future time and does not result in an immediate behavior change by the device.

9. The control unit of claim 1, wherein the control action for the device is determined further based on a control action for a device included in a second system within the one or more structures.

10. The control unit of claim 9, wherein the control unit determines the control action for the device included in the first system based on at least one control objective associated with the one or more structures and based on the at least one control objective.

11. The control unit of claim 9, wherein a portion of the current state information is associated with the second system within the one or more structures.

12. The control unit of claim 1, wherein the control unit determines the control action for the device further based on at least one control objective associated with the one or more structures.

13. The control unit of claim 12, wherein the control objective comprises at least one of an economic cost associated with the one or more structures, an environmental cost associated with the at least one or more structures, a quantification of occupant comfort associated with the one or more structures, or a quantification of performance associated with the device or system in which the device is included.

14. The control unit of claim 1, wherein the control unit further generates the forecast information prior to determining the control action.

15. The control unit of claim 14, wherein the forecast information is generated via a forecasting model.

16. A computer system for controllinq the environment within a structure having a non-transitory computer readable medium that includes a set of instructions which, in response to execution by a processor of the computer system, cause the processor to perform the steps:

selecting a first controller from a set of multiple controllers wherein the predictive controller is capable of integratinq operations of independent systems within a structure and across multiple structures;

with the first controller, determining a control action for a first device included in a first system within one or more structures based on current state information associated with the one or more structures and forecast information wherein a meta controller within the first controller evaluates the suitability of the first controller for communication with the first system such that in the event the first controller is not suitable a replacement first controller is selected for communication with the first system; and with the first controller or replacement first controller, transmitting a control signal based on the control action to the first device thereby controlling the output of the first device; and selecting at least one subsequent controller from the set of multiple controllers to determine a separate control action in parallel with the first controller or replacement first controller, wherein the steps further include, after transmittinq the control signal based on the control action to the first device, selectinq a second controller from the set of multiple of controllers based on current state information associated with the one or more structures and additional state information associated with the one or more structures, wherein the second controller has a qreater data input requirement than the first controller.

17. The computer system of claim 16, wherein the forecast information includes as least one of power generation forecast information, weather forecast information, grid-signal forecast information, or energy cost forecast information.

18. The computer system of claim 17, wherein the steps further include determining the power generation forecast information based at least in part on the current state information associated with the one or more structures.

19. The computer system of claim 16, wherein the steps further include:

selecting a second controller from the set of multiple of controllers;

with the second controller, determining a control action for a second device included in a second system within one or more structures based on current state information associated with the one or more structures and forecast information; and transmitting a control signal based on the control action for the second to the second device.

\* \* \* \* \*